INVENTOR.
THOMAS FALK
ATTORNEY

INVENTOR.
THOMAS FALK

BY Robert Anne Nesta

ATTORNEY 3,204,188
SCANNING PROCESSING CIRCUITS ELIMINATING DETECTOR TIME CONSTANT ERRORS
Thomas Falk, Norwalk, Conn., assignor to Barnes Engineering Company, Stamford, Conn., a corporation of Delaware
Filed Nov. 2, 1961, Ser. No. 149,730
6 Claims. (Cl. 328—111)

This invention relates to improved electronic processing circuits for scanners which eliminate errors due to slow detector time constants.

In the past scanning devices for measuring dimensions have become important especially those operating in the infrared. For example, the patent to Astheimer No. 3,003,064 describes a scanner and electronic processing circuits for use particularly in the measurement or continuous monitoring of the dimensions of hot extruded objects such as steel rods and bars, glass tubing and the like. The measurement depends on measuring the time interval between the radiation discontinuity at the edges of the material to be measured. This discontinuity may be between a cool background and a hot object or between a background giving off relatively more radiation and an object which is relatively opaque. In the latter case the radiations used will often be visible but in the case of hot objects operation in the near infrared is ordinarily used. The Astheimer gage employs processing circuits which produce an electrical quantity which is proportional to the duty cycle ratio between total scan time and time when the scan is moving across the hot object. This device has achieved commercial success in the monitoring of steel rods and bars.

The electronic circuits used in the Astheimer gage compensate for changes in temperature, changes in scanning speed and within limits changes in the nature of the surface such as its emissivity. In the case of steel rods these last changes are not so great that they go beyond the compensatory capabilities of the processing circuits. Other scanning devices, for example, horizon sensors may encounter more drastic radiation changes as they sweep across the disc of the particular body in question, for example, the earth. There is a line or zone of radiation discontinuity between a portion of the earth's disc which is in sunlight and the part which is not illuminated. Also, cold clouds may present even sharper radiation discontinuities. Often these radiation differences exceed the capabilities for compensation of ordinary processing circuits and so for this type of scanner there is an additional problem. Both problems are solved by the present invention which will be described by way of illustration in connection with an Astheimer dimensional gage scanning device and with a horizon sensor. Optimum circuits are somewhat different for the two uses but both include compensation for detector response time.

As the Astheimer gage scans across a moving hot steel rod the radiation jumps when the edge of the hot object is encountered and there is also a sharp drop when the scan leaves the hot object. Ideally with a detector of infinitely short time constant the resulting output would be a square or rectangular wave with vertical sides and with only small fluctuations of the top of the wave due to the emissivity changes in different parts of the rod as the scan moves across it. Any temperature changes will also be reflected but in the case of a steel rod they are minor and the main changes are in the emissivity of the surface. The processing circuits described in the Astheimer patent and others which have even sharper response result in a signal which is limited, that is to say does not change with small differences in radiation intensity and which is centered, that is to say the final output signal is proportional to scan duration between the half way points on the rise and fall of the detector output. With perfectly square waves this gives an accurate dimensional reading regardless of temperature changes, emissivity changes and other factors entering into the detector output signal so long as the changes in radiation do not exceed half of the maximum, in other words do not drop below the center of the wave where the electronic measurements are taking place. In the case of hot material such as steel rods this is always true and so varying temperatures and emissivities would create no problem. In the case of horizon sensors, however, there may be cold clouds at various points across the disc scanned or a terminator line between day and night. These radiation differences can easily exceed half of the maximum radiation and so can result in an error with circuits which slice in the middle of the detector output.

Unfortunately, detectors have finite time constants. This is particularly true with thermistor detectors but is also true with photoconductors. In other words, the output of the detector is not a square wave but a trapezoidal wave with exponentially sloping rise and sloping fall. Also, because of variations in the level of incoming radiation response these two slopes may not be equal. The higher the temperature the steeper the corresponding slope. Other factors are even more serious. When the scanning beam strikes the edge the finite field of view of the scanning beam is not immediately filled and radiation appears to be less intense. At first the detector sees the edge at grazing incidence at which time the radiation from a unit area which strikes the detector is small. As it moves on to the surface of a round bar it soon reaches a point where the field of view is filled and maximum intensity detected. This effect will be noted even with a perfect black body. In addition the effect is aggravated when the body is not a perfect radiator and exhibits direction sensitive emissivity. The above effects may often be sufficiently large to be interpreted as a false measurement.

While the Astheimer gage has proven to be commercially very successful even with its present circuits this is due to the fairly generous tolerances which are acceptable to steel mills and which were essential when the old fashioned hand gage at the end of a rod extrusion was used. These tolerances were large enough so that the errors which are referred to above often did not exceed the tolerances. There is, however, a demand for measuring instruments of even higher precision. These have not been possible with the electronic circuits used.

The present invention is directed to a different type of processing circuit in which two things are accomplished. First the errors due to the finite detector time constants and to shape of the edge of the discontinuity are reduced to negligible proportions. Secondly, the effect of very great radiation differences is substantailly eliminated. This is done by two properties of the circuits. First, the slicing or centering of the signal is not at the mid point of the rising and falling slopes of the wave. It is only a very little above the background radiation level. The limit here is the irregularities in the background. This results in a uniform response even though there may be very great differences in radiation across the material being scanned. The second thing which the circuits do is that they add the two small portions, in terms of scanning time, of the slopes which are still left. This compensates completely for changes in the geometry of the edge being scanned, for the effects of detector time constant and slicing level differences at the rising and falling edge of the signal.

In general when a very low level of signal is reached a trigger circuit is fired so that the output as long as the signal is emitted remains at a uniform level. The compensation for the slopes before the trigger is fired is effected by a circuit which utilizes both differentiating and integrating effects which may be referred to as a combined lead and lag network. The network also operates a generator such as a staircase generator, which produces a quantity which is proportional to the time between the scan encountering the edge of the discontinuity and the firing of the trigger circuit. This quantity adds in the processing circuits either at once or after storage. The nature of the circuit operation will become apparent from a more detailed description in conjunction with the drawings in which:

Figure 1:
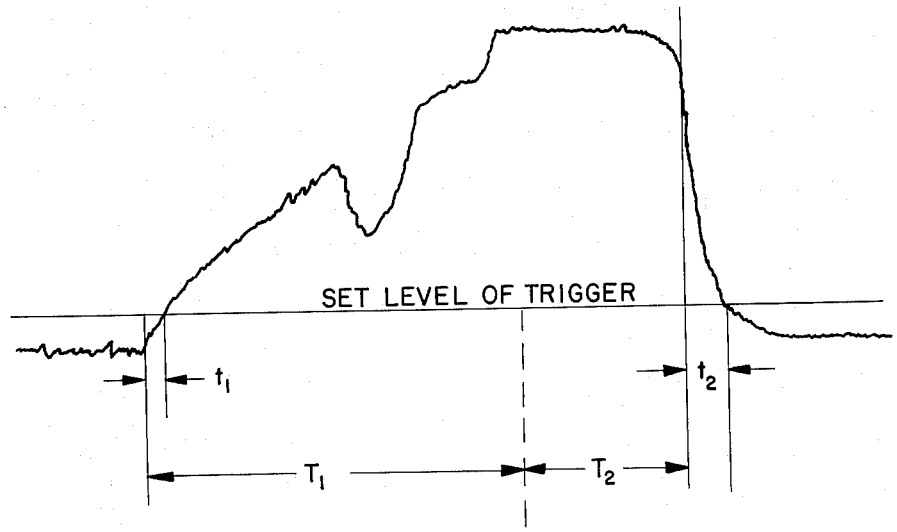
FIG. 1 is a profile of detector output for a horizon sensor.

FIG. 1 shows the profile of an output signal from a detector. In order to illustrate compensations both for edge effects and for very great radiation differences across the object being scanned the output wave is taken from a horizon sensor. If it had been taken from the scanner of an Astheimer gage the wave would have steadily risen to a peak which would be maintained with small variations much less than half the total peak value.

As the problem of cold clouds, that is to say big temperature differences, is much more serious and common with horizon sensors the invention will be described first in connection with this use as it brings out the corrections for all of the possible errors whereas in the case of a dimension gage the temperature error may not occur.

It will be noted that on FIG. 1 a level is given for the point at which the trigger circuit fires. Trigger circuits are well known. One of them is the so-called Schmitt circuit. Another and more accurate one is described and claimed in the patent of Monty M. Merlen, Serial No. 3,109,943 filed November 5, 1963. As the present invention does not in any way change the trigger circuits, except, of course, to set their triggering level at the desired point, the circuit is represented as a block in the diagram on FIG. 3.

As the scan moves across the edge of the material to be scanned there is a sudden change in the radiation. This is differentiated in the lead and lag network as will be described below. However, the trigger does not fire immediately because a certain level of output signal must be reached to prevent spurious triggering by noise. This occupies the time shown on FIG. 1 as $t_1$. The time scale, which is horizontal, is somewhat exaggerated for clarity in the drawing. As soon as the triggering level is reached the trigger circuit fires and a steady output voltage continues. In the meantime the output signal is rising. Again the slope of rise has been shown flatter because of the exaggeration of the time scale. Even if there is a sharp dip, which in FIG. 1 is shown diagrammatically as caused by a very cold cloud in a horizon sensor, the trigger circuit is not affected because the radiation does not fall below the level at which the trigger circuit cuts off. Therefore, the relatively enormous fluctuations in radiation level do not produce any change in output whereas with the normal circuit used in scanners particularly of the Astheimer type where the output signal is sampled at the center the fluctuations would go beyond it.

The scanning mechanism, as is customary, is provided with a reference pulse generator at the center of the total scan period. It should be noted that this is the center of the total scan period but it is not necessarily the center of the time when the scanning is half way across the object to be scanned. The occurrence of the scan centering pulse is shown by the dashed lines in FIGS. 1 and 2. The pulse is shown as occurring more than half way between horizons. This corresponds to a tilted vehicle and is greatly exaggerated for clarity. Finally the scan moves across the edge of the material scanned and the detector output now rapidly falls off, but the trigger circuit does not immediately respond until the output signal has reached the trigger level.

In FIG. 1 the following scan intervals are represented. The time between encountering the edge of the material to be scanned and firing of the trigger has already been described as being designated $t_1$. The time from the edge to the scan center pulse is shown as $T_1$. The scan time from the center pulse to the edge of the material to be scanned is represented by $T_2$ and the scan time from the edge until the signal drops to the trigger level is represented by $t_2$.

Figure 3:
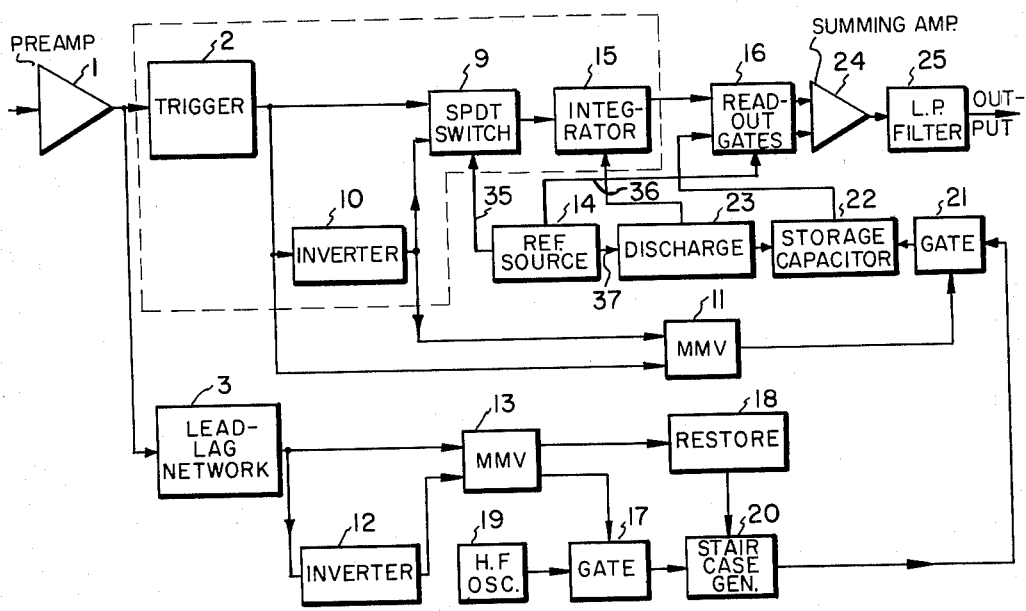
FIG. 3 is a block diagram of the electronic circuits for a horizon sensor.
Figure 4:
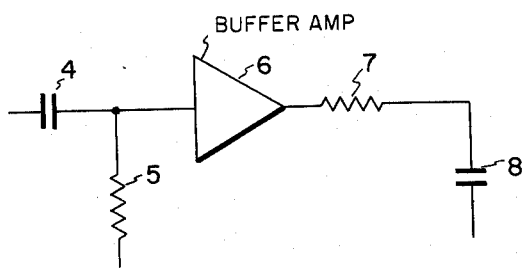
FIG. 4 is a simplified schematic of the lead and lag circuits.

Considering FIG. 1 it will be noted that the measure as far as the trigger circuit output is concerned to the scan center pulse is $T_1-t_1$. The scan time from the center pulse until the trigger shuts off is $T_2+t_2$. It will be noted that as far as the trigger circuit signal is concerned it is too small by the quantity $t_1$ and oo large by the quantity $t_2$. The circuits including correction for the above error are shown in FIG. 3. The portion covered by the trigger circuit and output is shown in the area bounded by dashed lines. The output signal from the radiation detector or detector bridge is amplified in preamp 1 of conventional design. The output of this amplifier goes to a trigger circuit 2 which may be a Schmitt trigger or a Merlen trigger as mentioned above. Another portion of the output is connected to a lead and lag network 3. This network is shown in FIG. 4 and consists of a differentiating circuit with condenser 4 and resistor 5 feeding a buffer amplifier 6 into a low pass or integrating circuit with the resistance 7 and capacitor 8. The buffer amplifier is not essential to the operation of the network, but as it is a very simple electronic element it is preferred to include it as it produces a somewhat more precise result by preventing interaction of the differentiating and integrating circuits.

The lead lag network requires a choice of component values and, of course, buffer amplifier response to correspond to certain frequencies. The first frequency is that corresponding to the fastest rise time expected and the differentiating network is set to differentiate up to a somewhat higher frequency so that sharp differentiation is obtained at the fastest expected pulse rise time. The low pass circuit corresponds in time constant to a frequency higher than the limit frequency of the differentiating network, kept as low as possible the limit being set by that it would introduce ringing at the fastest expected pulse rise time. The sharp drop off with frequency of the circuit eliminates high frequency noise. The effect of the two circuits is to introduce a lead in the first portion and a lag in the last portion.

The outputs of both the trigger circuit 2 and the lead lag network 3 are divided. Part of the trigger output goes to one contact of a SPDT switch 9. Another portion passes to the input of an inverter 10 and a third portion to a monostable multivibrator 11. The output of the lead lag network divides, part going through an inverter 12 and part to one contact of a monostable vibrator 13. The outputs of inverters 10 and 12 lead respectively to the second contact of the switch 9 and to another input of the multivibrator 13. In addition the output of the inverter 10 is also connected to another input of the multivibrator 11.

As was described above, the system operates with a standard frame reference pulse, corresponding to vehicle center, the occurrence of which is shown by the dashed line in FIG. 1. This pulse generator is represented on FIG. 3 at 14 and is shown diagrammatically in FIG. 7. The reference pulse source generator is shown as a reticle disc with a magnetic insert 34 which passes adjacent the coils of three reference pulses pickups 35, 36 and 37. The spacing of the pickups depends on the particular circuit as will be described below. There is illustrated the situation where two of the pickups are close to each other and somewhat more than 90° from the first pickup. The output of the switch 9 passes through an integrator circuit 15 into one input of a readout gate circuit 16 of conventional design, namely, two parallel gates, both actuated simultaneously by the second pulse from the reference source 14. One of the two parallel gates passes the signal from integrator 15 into summing amplifier 24; the second parallel gate passes the signal from a storage capacitor 22, which will be described below, into the same summing amplifier 24. A typical configuration for each of the two gates is described in FIG. 14–20 on page 444 of "Pulse and Digital Circuits," by Millman and Taub (McGraw Hill Book Company). The configuration referred to is a typical gate circuit, but is one of a large number of known gate circuits. The present invention is in no sense limited to the exact gate referred to, which is purely illustrative.

The outputs of the monostable multivibrator 13 lead respectively to a gate circuit 17 and to a restoring circuit 18. A stable high frequency oscillator 19 is connected to the input of the gate 17. When this gate is opened the high frequency oscillations enter the staircase generator 20, which is also controlled by the restoring circuit 18 so that when this circuit receives a signal the staircase generator is restored to its zero volt condition. The output of the staircase generator 20 passes into a gating circuit 21 which is controlled by the output of the multivibrator 11. The output of the gating circuit is connected to a storage capacitor 22 which in turn is connected to a second input to the readout circuit 16. Discharge of the storage capacitor 22 is effected by the discharge circuit 23 under control of the frame reference pulse. The discharge circuit is formed of two shorting switches actuated by the same reference pulse, the third one; one switch shorts the output of the integrator 15 and the other shorts the capacitor 22, producing its discharge. The outputs from the readout gate circuit 16, which is really a dual gate circuit for each of its inputs, are introduced into a summing amplifier 24 the output of which after passing through a low pass filter 25 constitutes the output signal of the system.

The storage capacitor 22 and the capacitor which forms a portion of the staircase generator should have different values. The precision of measurement is determined by the frequency of the oscillator 19 and the capacitor in the staircase generator 20 should be much smaller than the storage capacitor 22. This is done to simplify the mathematical relations of the signals.

Figure 2:
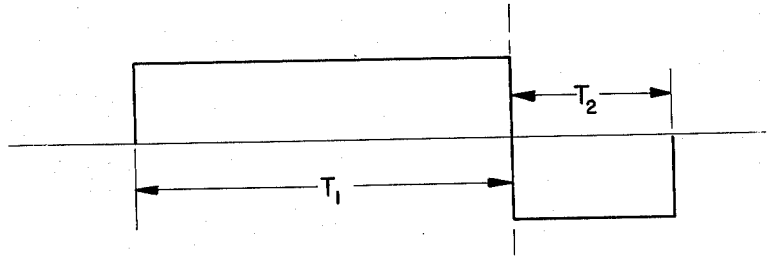
FIG. 2 is a representation of the rectangular wave from the single pole double throw switch of the horizon sensor electronics.

The operation of the circuit can be understood by considering what happens in a cycle of detector output shown in FIGS. 1 and 2. As the edge of the object being scanned is encountered the slope of the wave changes. This is perceived by the differentiator in the network 3 and a positive signal pulse is applied to the multivibrator 13. This turns on the multivibrator which is provided with a time constant longer than the longest expected time interval before the triggering level is reached. In other words, the time constant of the multivibrator is longer than $t_1$. The inverter 12 results in giving a signal to the multivibrator 13 regardless of whether the pulse is positive or negative. Multivibrator 13 opens the gate 17 and during the whole of the time $t_1$ oscillations from oscillator 19 build up voltage on the output capacitor of the staircase generator 20. The voltage is, of course, directly proportional to $t_1$. When the triggering level is reached the trigger 2 fires and a part of the output leads to the multivibrator 11. The inverter 10 assures that regardless of whether there is a positive or negative pulse from the trigger circuit it will always be interpreted as a positive pulse in the multivibrator 11. The multivibrator then fires and opens the gate 21 which permits transfer of the charge from the staircase generator 20 onto the storage capacitor 22. The time constant of multivibrator 11 is shorter than one step in the generator 20, therefore, there can never be a difference of more than one step in the staircase as far as the charge on the storage capacitor 22 is concerned. This is one factor in determining the limiting precision of the instrument.

After the very short time of the constant of multivibrator 11 has passed it returns to its stable state and closes the gate 21. A little later the multivibrator 13 with its somewhat longer time constant also returns to its original state which closes the gate 17 and actuates the restoring circuit 18 so that the staircase generator 20 is reset to zero. The net effect of the operations described above is to impart to capacitor 22 a charge proportional to $t_1$.

As the scan continues even a sharp drop in output which is indicated in FIG. 1 as a cold cloud on a horizon sensor will not affect the trigger circuit. Its output remains constant because the signal has not reached the very low level at which the trigger is set. Since the gate 21 remains closed the fact that the changes in slope will cause the lead lag network to operate has no effect on the charge of the storage capacitor 22. As the scan proceeds it passes the frame reference pulse generator 35 which reverses the switch 9. This changes polarity of the output from the trigger circuit because the other contact of the switch is connected to the inverter 10. The multivibrator 11 is not actuated because there is no new pulse.

The pulses generated by the frame reference 14 also perform two other functions. The pulse frame pickup 36 opens the readout gates 16 so that the voltages corresponding to $t_1$ and $T_1$ from the integrator 15 are introduced into the summing amplifier 24. Then the pulse frame 37 discharges the capacitor 22 through the circuit 23.

As the scan proceeds the edge of the object scanned is encountered. There is now a negative pulse which actuates the network 3 and the multivibrator 13 is again actuated for the inverter 12 has changed the negative pulse into a positive one. This starts the staircase generator operating as described above and the capacitor in the generator 20 charges up in steps reaching a voltage corresponding to $t_2$. At this moment the triggering level is reached. There is a negative pulse which the inverter 10 inverts causing the multivibrator 11 to open the gate 21 for a brief instant and the storage capacitor 22 receives this part of the charge from the generator 20. Gate 21 then closes as multivibrator 11 returns to its normal state. The storage capacitor now also passes on its charge through the gate circuit 16 and is added in the summing amplifier. The summing amplifier has continued to receive the output from the trigger circuit, but as shown in FIG. 2 the frame reference pulse has changed the polarity of the signal during the period $T_2$. The positive voltage due to $t_2$ reduces the negative $T_2$. This determines the relative position of the horizon sensing scan and produces a net voltage which has automatically corrected for $t_1$ and $t_2$. It, therefore, represents an accurate measure from the actual edges of the object scanned and so produces an error signal which actuates conventional righting means to restore the vehicle to level flight at which point the output drops to zero regardless of magnitudes of $t_1$ and $t_2$. The only theoretical possibility for error is when there is a cold cloud scanned within one time constant of monostable multivibrator 13 from the horizon. If it is deemed necessary even this possibility can be eliminated by the inclusion of an additional, negative pulse actuated, multivibrator as described in FIG. 5 below.

Figure 5:
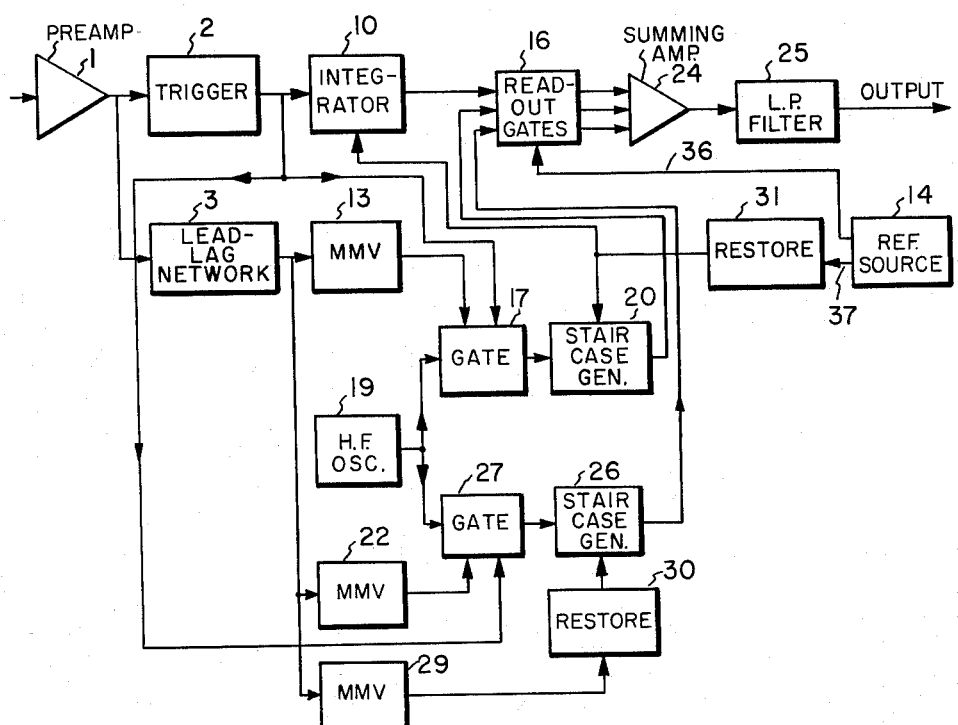
FIG. 5 is a circuit for a dimensional gage.

The circuits which adapt the present invention to dimensional gages are somewhat different because there is no longer a frame reference position which is unique as in the case of horizon sensors. Looking at the problem in another way the horizon sensor is concerned with a pulse position in a scan. The gage is concerned with a pulse width corresponding to the material being gaged. FIG. 5 illustrates a circuit which applies the principles of the present invention to a dimensional gage such as, for example, an Astheimer gage. The elements which perform the same functions as in FIG. 3 bear the same reference numerals. The readout gate 16 has three inputs which will be described below. The circuits of the gates are exactly the same as the corresponding gate numbered 16 of FIG. 3, except that there are three gates in parallel controlled by the same gating signal instead of two.

Figure 7:
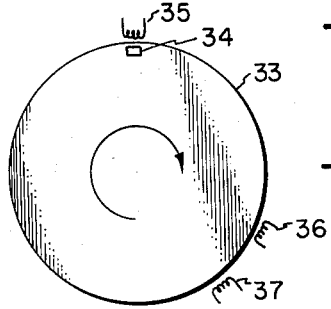
FIG. 7 is a diagram of a typical source reference generator.

There is a basic difference in the frame reference pulse. Instead of three, only two, 36 and 37, are used. They are located sufficiently beyond the far edge of the scan so that even with some displacement, which may be caused by whipping of a steel rod, the pulse will not occur in the middle of the scan. The relative locations of 36 and 37 are shown in FIG. 7 for the circuits of FIG. 3. The circuit will best be understood by describing a particular scan across an object to be measured, for example, a hot steel rod. The infrared detector is connected to a preamplifier 1 just as in FIG. 3. When the edge of the rod is encountered there is a change in slope that causes the lead lag network 3 to respond as described above. This also actuates a monostable multivibrator 13 which in turn opens a gate 17 permitting oscillations from the high frequency oscillator to pass onto the staircase generator 20. As in the case of the horizon sensor the time constant of multivibrator 13 is sufficiently long so that it exceeds the time of either $t_1$ or $t_2$. When the triggering level is reached the trigger 2 fires. This circuit has a connection to gate 17 so that it closes the gate. In other words, this gate is only open if the multivibrator 13 is on and at the same time the trigger circuit is off. In the meantime the staircase generator 20 has charged up an amount corresponding to the time $t_1$ and its output capacitor retains this charge. The trigger circuit passes on to an integrator 10 which has a sufficiently long time constant so that it is capable of building up its energy from the trigger circuit throughout more than a full scan.

The trigger circuit is also connected to a second gate 27 which connects oscillator 19 to a second staircase generator 26. This gate, however, opens only when both the trigger circuit and a second monostable multivibrator 22 are on. This multivibrator is actuated only by negative pulses from the network 3. When the far edge of the rod is reached there is a negative pulse in the network 3, multivibrator 22 fires and as the trigger circuit is still on the gate 27 is opened. The staircase generator 26 is, however, a negative generator and builds up a negative charge. This generator was cleared by a restoring circuit 30 actuated by a third multivibrator 29 on the same negative pulse. This third multivibrator has an extremely short time constant less than one stair step. After the trigger circuit level is reached to turn off it shuts the gate 27 the staircase generator retaining its negative charge on its output capacitor. Both staircase generators and the integrator 10 are connected to split inputs of the readout gate 16. Presently the frame reference pulse is generated at 14. This opens the readout gates 16 which pass on to the summing amplifier 25, the charge from the integrator 10, the positive charge from the staircase generator 20 and the negative charge from the staircase generator 26. In other words, this passes on an output corresponding to $T_1+t_1-t_2$ which is the correct width of the material gaged. The reference frame pulse also actuates a restoring circuit 31 which has a short delay. When the delay has passed the staircase generator 20 is restored.

If the circuit elements 29 and 30 are incorporated in FIG. 3 they will perform a function similar to the one they perform in FIG. 5 and this can be used to eliminate any error due to a cold cloud close to the horizon. It is only after the horizon is reached that there is a continuous negative slope longer than the very short time constant of the multivibrator.

Figure 6:
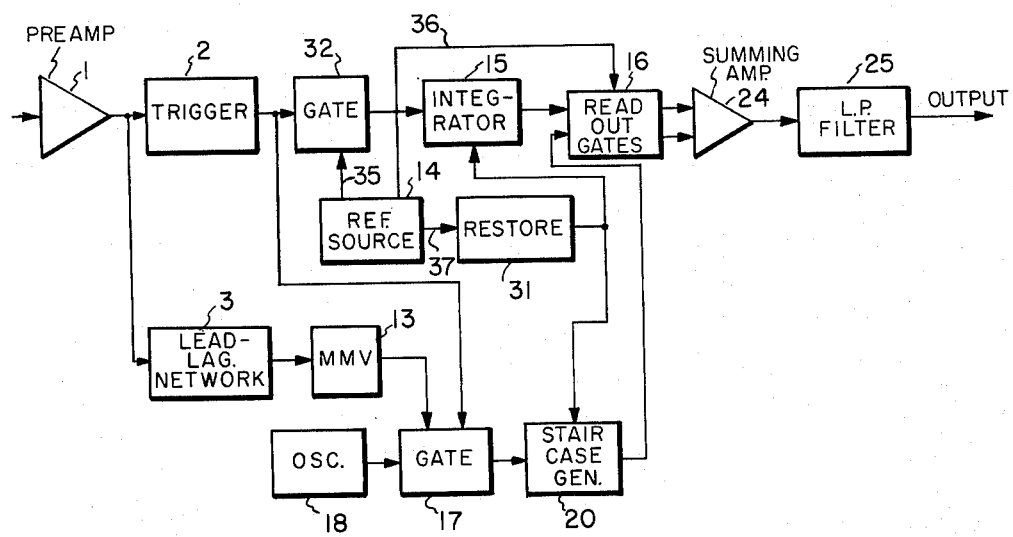
FIG. 6 is a simpler circuit for multiple head gages.

FIG. 6 illustrates a simplified circuit which can be used for dimensional gages when a plurality of scanning heads surround the object to be measured symmetrically. The minimum number of scanning heads, of course, is 3. When there is a plurality of symmetrically arranged scans many variations in the contour of the material being measured are averaged out and when the permissible tolerances are moderate as they are in the monitoring of steel rods and bars it is possible to use a simplified circuit and to use a single set of processing electronics for all three scans. The scans, of course, are sequentially switched to the processing circuits by conventional switching means. It is, however, necessary to maintain the three scans in synchronism so that they will not drift too much. This is also effected with self-synchronous scanning motors.

Essentially the circuit of FIG. 6 measures from the leading edge to a frame reference which would be perfectly centered if the rod were in its normal position. The operation will be first described on this assumption and the correction for movement of the rod from its central position will then be brought out. As in the case of FIG. 5 the same elements as are used in FIG. 3 will bear the same reference numerals. When a scan starts and reaches the edge of the rod the output from the detector rises and after amplification in the preamplifier actuates the lead lag network 3 which fires its monostable multivibrator 13 opening the gate 17 and permitting the oscillator to actuate the staircase generator 20. This sequence is exactly the same as in FIG. 3 but the gate 17 is of slightly different design as it has an additional input from the trigger circuit 2. The inputs are designed so that the gate will only open when the multivibrator 13 is on and the trigger circuit is off. However, when the scan first encounters the rod this is the situation and so the operation of the staircase generator 20 is effected in the same manner as in FIG. 3. When the detector output level becomes high enough the trigger circuit is fired and this closes the gate 17 again producing the same result as in FIG. 3, that is to say stopping the staircase generator 20 at a time when it has accumulated a charge proportional to $t_1$. The trigger circuit output passes through a normally open gate 32 to its integrator 15 which is provided with a sufficient time constant so that it is capable of integrating the output from the trigger circuit for more than half a scan. The integrator output leads into readout gates 16 to which the staircase generator 20 is also connected.

At a point in the scan cycle which would be exactly centered if the rod were centered the frame reference pulse is produced by 35 which closes the gate 32. When 36 is reached it opens the readout gate 16. Shortly thereafter 37 produces a pulse which actuates restoring circuit 31. The opening of the readout gate passes on the charges accumulated in the integrator 15 and staircase generator 20. They are summed in the amplifier 25 and pass through a low pass filter 25. This operation is the same as in FIG. 3. Then the restoring circuit 31 discharges the capacitors in the integrator 15 and the staircase generator 20 so that they are restored to their original condition. The gate 32 has a suitable time constant long enough so that it will again open only after the scan has completed and before the trigger circuit fires on the next scan.

The net effect of the FIG. 6 is to put approximately half a scan including a correction for $t_1$ onto the readout.

This does not compensate exactly for individual variations of $t_2$ as compared to $t_1$. However, the averaging effect of three or more symmetrical scans reduces this possible error very greatly and for ordinary steel mill operating purposes the result obtained is well within accepted tolerances.

As was stated above the description of FIG. 6 presupposed that the rod to be measured was in its normal position so that the frame reference pulse corresponded to the instant when the scan was exactly half way across the rod. In practice, of course, this will not obtain for the rod whips a little as it moves at high speed and so its positions will vary somewhat in a small region around the normal centered position. However, this does not adversely affect the reading of a cycle of scans from all of the heads because when the scanning heads are symmetrically disposed the average of their readings corresponds to a rod position in the exact center. Therefore, although at any instant the rod may not be centered the averaged output still measures the dimensions accurately as if the rod were centered. This is an important property because of the necessary whipping of the rod and it is an advantage of the simplified modification of the invention described above that results of acceptable accuracy are obtained with only a single set of less complicated processing circuits. It will be seen when FIG. 6 is compared with FIG. 5 that many elements are omitted. For example, there is only one multivibrator instead of three, one staircase generator instead of two and so on. There is a theoretical limit on the accuracy but not a practical one. If the rod whipped at a higher rate than that corresponding to three scans in sequence the averaging would not take place accurately. This, however, is of no practical significance because the scanning rates which, for example, may be 30 times a second are far shorter than any period of whip.

I claim:

1. Processing circuits for accurate measurements of a quantity selected from the group consisting of signal pulse width and pulse position which comprise in combination an input circuit for the said signal pulse, an amplifier having an output connected to
    (a) lead and lag network and a trigger circuit with inputs in parallel, said trigger circuit having a predetermined but relatively low triggering level not greatly in excess of normal noise amplitude, and producing a first electrical quantity in its output,
    (b) means actuated by the lead and lag network for producing a second electrical quantity proportional to the time between the start of the leading edge of the signal pulse and the instant at which the trigger circuit firing level is reached,
    (c) means, including storage means, for combining the first electrical quantity with the second electrical quantity produced by the trigger circuit output,
    (d) means for generating three reference pulses, the first reference pulse being generated at a predetermined point during the signal pulse, means actuated by said first reference pulse to reverse the polarity of the trigger means output,
    (e) a summing readout means, means actuated by the second reference pulse to connect the quantities produced by the said trigger circuit output and the means actuated by said lead and lag network to the readout means,
    (f) means actuated by the third reference pulse for resetting the storage means of (c), and
    (g) means for restoring the circuits actuated by the lead and lag network and the circuit actuated by the trigger circuit to their initial conditions after the quantity at the output of the readout circuit has been measured, the restoring means for the circuit actuated by the lead and lag network producing restoration after the trigger circuit has been actuated and before the start of the trailing edge of the signal pulse.

2. Processing circuits according to claim 1 in which the circuits actuated by the lead and lag network include at least one staircase generator with a gate controlled by a multivibrator actuated by lead and lag network output and having a time constant longer than the longest time between pulse start and triggering level.

3. Processing circuits according to claim 1 for the measurement of pulse width from the detectors of at least three sequential and symmetrically spatially separated dimensional scans which comprises,
    (a) means for sequentially connecting the input circuit in synchronism with the sequence of the scans,
    (b) a normally open gate connected to the output of the trigger circuit,
    (c) an integrator receiving output from the gate and having a storage capacity sufficient to store trigger signal and electrical quantity from the means actuated by the lead and lag network during more than half a scan cycle,
    (d) the first reference pulse at a predetermined point with respect to the center of each scanning pulse being connected to close the gate in the output of the trigger circuit.

4. Processing circuits according to claim 1 in which the first reference pulse occurs in the theoretical center position of the signal pulse to be measured and the lead and lag network actuates its circuits to produce both the first electrical quantity and a quantity proportional to the time between the beginning of the trailing edge of the signal pulse and the instant at which the trigger circuit is turned off, whereby an output is produced which is a function of the position of the reference pulse with respect to the center of the pulse to be measured.

5. Processing circuits according to claim 4 in which the reference pulse actuates circuits inverting the polarity of the trigger circuit output and both quantities produced by the circuits controlled by the lead and lag network are of the same polarity.

6. Processing circuits for the accurate measurement of signal pulse width which comprise in combination an input circuit for the signal pulse, an amplifier having an output connected to
    (a) lead and lag network and a trigger circuit with inputs in parallel, said trigger circuit having a predetermined but relatively low triggering level not greatly in excess of normal noise amplitude, and producing a first electrical quantity,
    (b) means actuated by the lead and lag network for producing a first electrical quantity proportional to the time between the start of the leading edge of the signal pulse and the instant at which the trigger circuit firing level is reached,
    (c) means for producing a third electrical quantity of opposite polarity to said second electrical quantity, said means being actuated by a negative pulse from the lead and lag network and having a time constant greater than the period from negative pulse to trigger circuit cutoff,
    (d) an integrator connected to the output of the trigger circuit and capable of storing the output of a period longer than maximum trigger circuit operation,
    (e) means for generating two reference pulses in sequence, the first reference pulse occurring after trigger circuit shutoff and connecting the quantities produced by the trigger circuit and the two means actuated by the lead and lag network to an algebraically summing readout circuit, the second reference pulse restoring said integrator, positive lead and lag pulse actuated quantity producing means, and
    (f) lead and lag negative pulse actuated means for restoring the negative pulse actuated means for producing the third electrical quantity, the time constant of said restoring means being shorter than a unit negative electrical quantity, whereby the lead and lag actuated means produce second and third electrical quantities, said second means responding effectively only to negative pulses from the lead and lag network of substantial duration.

References Cited by the Examiner

UNITED STATES PATENTS

| 2,421,138 | 5/47 | Wheeler | 328—163 |
| 2,691,729 | 10/54 | Cornell | 328—173 |
| 2,763,721 | 9/56 | Hansell et al. | 328—163 X |
| 2,958,043 | 10/60 | Harding | 328—165 X |

OTHER REFERENCES

Hunter: Handbook of Semiconductor Electronics, 1956, pages 18–6 and 18–7.

ARTHUR GAUSS, *Primary Examiner.*